I. REYNOLDS.
Assignor to himself and L. D. REYNOLDS.
Book-Binding.
No. 8,056. Reissued Jan. 22, 1878.
Fig. 1.
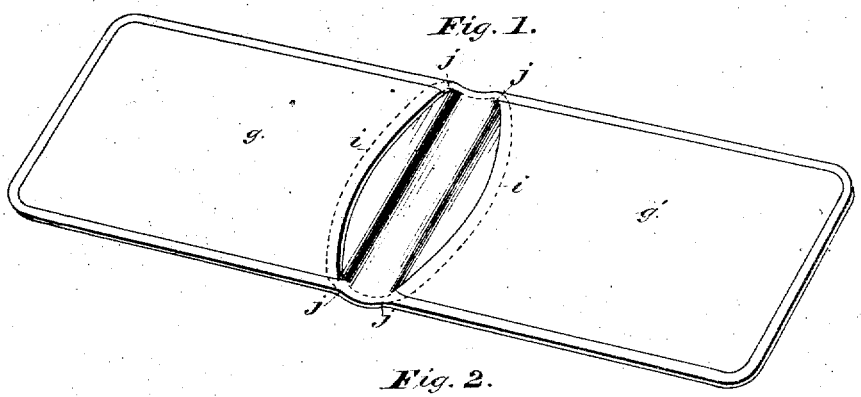
Fig. 2.
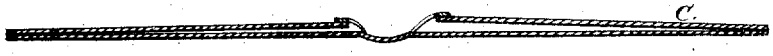
Fig. 3.
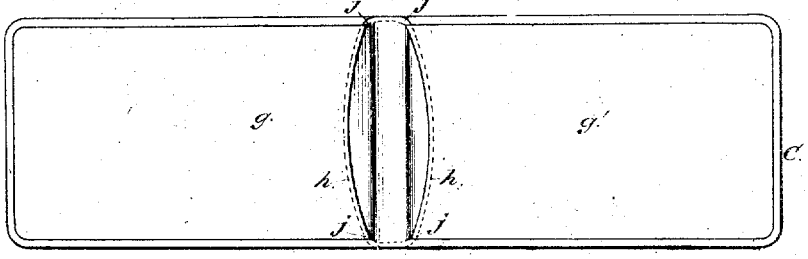
Fig. 4.
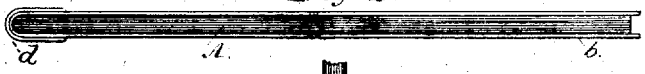
Fig. 5.
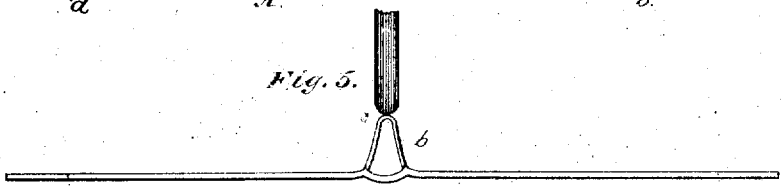
Fig. 6.
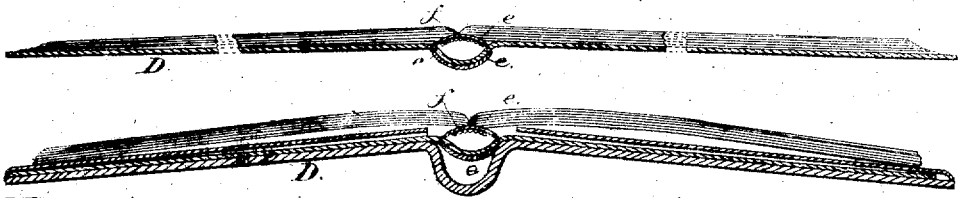
Fig. 7.
Witnesses
F. C. Brecht
F. C. Fipton
Inventor:
I. Reynolds

UNITED STATES PATENT OFFICE.

IRA REYNOLDS, OF DAYTON, OHIO, ASSIGNOR TO HIMSELF AND LUCIUS D. REYNOLDS.

IMPROVEMENT IN BOOK-BINDINGS.

Specification forming part of Letters Patent No. 193,036, dated July 10, 1877; Reissue No. 8,056, dated January 22, 1878; application filed January 3, 1878.

*To all whom it may concern:*

Be it known that I, IRA REYNOLDS, of Dayton, in the county of Montgomery and State of Ohio, have invented certain new and useful Improvements in Books and Book-Bindings; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to books adapted for removable covers; and consists in a novel construction of the book itself, and also in a novel construction of the flexible removable binding or cover, all as more particularly hereinafter set forth, the invention being applicable for memorandum-books, as well as for larger books suitable for many business purposes, the book being in itself, independent of the removable binding, a complete covered book, but of cheaper grade of cover; but when connected with its supplemental or removable binder being capable of instant conversion into an elegantly-bound book, such removable binder being durable, and one of them answering the purpose of a finishing binding for scores or hundreds of the books.

In the accompanying drawings, Figure 1 is a perspective view of the flexible removable or exterior and finishing binding for a small memorandum-book; Fig. 2, a section through the pockets of the same, one of such pockets being shown more open or distended than the other; Fig. 3, a top view of the same; Fig. 4, an edge view, enlarged, of the book before its permanent cover has been placed or inserted in the pockets of the supplemental binding; Fig. 5, a book partly withdrawn from its supplemental or outer skeleton-binding. Figs. 6 and 7 are sections of a larger book embodying my invention, both showing the single spring-backs Fig. 6 exhibiting the book before placing the leaves of its permanent cover in the pockets of the removable binder, and Fig. 7, the spring-back with the permanent covers of the book in such pockets, and also illustrating the double spring-back.

The smaller or memorandum books A are severally composed of a certain number (as many as may be desired) of sheets of paper, and also of a cover-sheet, *b*, of a stronger and thicker paper or other material, but not costly. These are all stitched through together, cover, sheet, and all, and folded at one operation, or in one fold; and when so folded and cut or trimmed they form a perfectly flexible book, which is complete in itself, and may be used either with or without the exterior or skeleton binder C. This exterior or supplemental binder serves to give a beautiful finish, and to make a more perfect and durable book, and affords the manufacturer or dealer an opportunity of furnishing nearly any grade of book from the same stock, and thus lessening his expenses and avoiding the accumulation of dead stock.

In stitching the leaves and cover of the book together I do not, as is customary, tie the ends of the stitching-thread together on the inside of the fold of the book, thus leaving a bulging knot, which prevents the sheets lying in close flat contact at such fold; but, on the contrary, I carry such ends to the outside of the permanent cover *b*, and there tie them, thus permitting the leaves of the book to lie as flat as possible upon each other. A strip of cloth or paper, *d*, may then be pasted to the back, which not only covers and conceals such stitching-threads and knot or knots, and also finishes and re-enforces the back, but also secures the thread and its ends, and prevents all possibility of its getting untied or loose, or worn, thus materially adding to the strength and durability of the book.

In making the larger books, containing several instead of only one set of folded sheets, I sew them together in the usual manner around bands, tapes, or cords; but, instead of sewing together the sheets only, I provide a reasonably-stiff paper board, which, as in the smaller books hereinbefore described, is to form the cheaper and permanent cover of the book; and the striking difference between the manner of making my book and that of making ordinary books is, that the bands, tapes, or cords *e* pass through the stiff board or permanent cover *b*, and their ends are then turned back or retroverted upon the back of the book and glued thereto.

When trimmed this, as in the smaller or pocket memorandum-book first herein described, is a book complete; but like the memorandum-book, it can be readily supplied with a skeleton or supplemental finishing-binding, D, as shown in Fig. 7, such binding answering as a complete finish for many books, and always readily attachable and detachable at will.

In these larger books the bands, tapes, or cords may be concealed on the back, as before stated with regard to the stitching-threads and knots of the smaller books, by a backing-strip, *d*. When these larger books are opened it will be perceived that they have a spring-back, as shown at *f*, and it will also be seen that when the finishing binding or binder D is applied, the book and its binder together afford a book with the singular feature of a double spring-back, and the two lids of the permanent cover resting upon the two upturned points or lines of the back of the removable binder, naturally throw up the book in the center when opened, thus laying the book out as flat and near a level as, perhaps, can be possible under any possible construction. The double spring-back is shown in Fig. 7.

In the formation of the flexible finishing-binder C, the leather or other fine material of which it may be composed is brought over and glued or pasted to the inside board, forming its pocket *g*, and a cord, *h*, or tape *i* is put around the heading of this binder and pocket, and the material or leather is turned over the same to prevent its being torn at the points *j j j j* of the pockets when placing the permanent covers into the pockets, or removing them from the same, or when it is desired to use the two pockets for cards, or for purposes other than that of securing the two permanent covers *b* to the removable cover C.

It will be seen that in the formation and construction of this cover it not only furnishes a beautiful, flexible, and durable binding for the book A, but the two pockets, preferably curved at their mouth or opening, and extending nearly the whole length of each half of the cover, furnish not only sacks for the reception of the two permanent covers *b*, but also receptacles for cards, papers, &c., usually kept in the pockets of pocket-books.

It will be understood that in making the removable covers for the larger books the body of the cover will be formed of a stiff board, and should have a rigid, round back, as shown, to receive the book, and the pocket is made of thinner material.

I claim—

1. The removable binder C, provided with a cord, tape, or band, *h i*, for the purpose of strengthening the pocket at the points *j j j j*, substantially as described.

2. In combination with a book complete, composed of leaves and cover, both stitched through the center, and both folded at one operation or in one fold, a removable binder, having pockets to be slid over the permanent cover of the book proper, such pockets being re-enforced at the points *j j j j* by means of the cords, tapes, or bands *h i*, substantially as described.

3. In combination with a flexible removable binder, a book complete, composed of leaves and cover, both stitched through the center, and both folded at one operation or in one fold, the stitching-threads thereof being firmly tied and secured to the back of the cover, substantially as herein set forth.

4. A book the ends of the binding tapes, cords, or bands of which pass through and are firmly secured to the back of the cover, substantially as described and set forth.

In testimony that I claim the foregoing I have hereunto set my hand this 3d day of January, 1878.

IRA REYNOLDS.

Witnesses:
H. J. ENGLAND,
A. L. ROBINSON.